(12) United States Patent
Kim et al.

(10) Patent No.: US 8,785,577 B2
(45) Date of Patent: Jul. 22, 2014

(54) ACRYLIC FINE PARTICLES AND DIFFUSING FILM INCLUDING THE SAME

(75) Inventors: Ju Sung Kim, Uiwang-si (KR); Kee Hae Kwon, Uiwang-si (KR); Hyun Yoo Kim, Uiwang-si (KR); Yeon Hee Son, Uiwang-si (KR); In Hwan Oh, Uiwang-si (KR); Yun Kyu Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 206 days.

(21) Appl. No.: 13/328,370

(22) Filed: Dec. 16, 2011

(65) Prior Publication Data

US 2012/0172554 A1  Jul. 5, 2012

(30) Foreign Application Priority Data

Dec. 30, 2010 (KR) .................. 10-2010-0139699
May 9, 2011 (KR) .................. 10-2011-0043613

(51) Int. Cl.
*C08F 120/18* (2006.01)
*C08F 220/14* (2006.01)
*G02B 1/04* (2006.01)
*C08L 33/10* (2006.01)
*C08F 222/10* (2006.01)
*G02B 5/02* (2006.01)
*C08L 33/08* (2006.01)

(52) U.S. Cl.
CPC ............. *C08F 220/14* (2013.01); *C08F 120/18* (2013.01); *G02B 1/04* (2013.01); *C08F 2222/1053* (2013.01); *C08F 2222/1026* (2013.01); *C08F 222/1006* (2013.01); *G02B 5/0242* (2013.01); *C08L 33/08* (2013.01); *C08L 33/10* (2013.01)
USPC ........................... 526/212; 526/210; 526/319

(58) Field of Classification Search
CPC .... C08F 220/14; C08F 220/18; C08F 220/32; C08F 220/42; C08F 220/28; C08F 222/1006; C08F 2222/1053; C08F 2222/1026; G02B 1/04; G02B 5/0242; C08L 33/08; C08L 33/10
USPC ......................................... 526/212, 210, 319
See application file for complete search history.

(56) References Cited

U.S. PATENT DOCUMENTS

| 4,271,283 A | 6/1981 | Puhk |
| 6,620,887 B2 * | 9/2003 | Fujimoto et al. ............... 525/193 |
| 2003/0232902 A1 * | 12/2003 | Takahashi et al. ............ 523/160 |

FOREIGN PATENT DOCUMENTS

JP     2000178398 A  *  6/2000
KR  10-2010-0075235 A     7/2010

OTHER PUBLICATIONS

Korean Office Action in counterpart Application Serial No. 10-2011-0043613 dated Sep. 25, 2013, pp. 1-5.

* cited by examiner

*Primary Examiner* — Michael M Bernshteyn
(74) *Attorney, Agent, or Firm* — Additon, Higgins, Pendleton & Ashe, P.A.

(57) ABSTRACT

Acrylic fine particles formed by polymerization of a (meth) acrylate containing monomer with a cross-linking agent are disclosed. The cross-linking agent includes a first cross-linking agent having at least three (meth)acryloyloxy groups and at least one functional group —OH, —COOH, or a combination thereof, and the acrylic fine particles can have a coefficient of variation (C.V.) of about 20 to about 60%. The acrylic fine particles can have high heat resistance and solvent resistance and also enhanced compatibility with a binder and a solvent. Accordingly, the acrylic fine particles can exhibit remarkably increased dispersibility when used in a diffusing film or the like, and thus are suitable for use as a diffusing agent.

15 Claims, 6 Drawing Sheets

Example 1

Comparative
Example 1

ACRYLIC FINE PARTICLES AND DIFFUSING FILM INCLUDING THE SAME

CROSS-REFERENCE TO RELATED APPLICATIONS

This application claims priority under 35 USC Section 119 to and the benefit of Korean Patent Application No. 10-2010-0139699 filed Dec. 30, 2010, and Korean Patent Application No. 10-2011-0043613 filed May 9, 2011, the entire disclosure of each of which is incorporated herein by reference.

FIELD OF THE INVENTION

The present invention relates to acrylic fine particles and a diffusing film including the same.

BACKGROUND OF THE INVENTION

Acrylic fine particles are widely used as light diffusing agents, additives for paints, various surface treatment agents, carriers, and the like. For example, acrylic fine particles can be used as a light diffusing agent to impart light diffusing effects to a diffusing film, a light diffusing plate, lighting equipment, and billboards.

Acrylic fine particles are generally prepared by suspension polymerization and have a spherical bead shape.

When acrylic fine particles are used to provide a diffusion effect, for example in a diffusing film, the beads are required to have solvent resistance (chemical resistance) to maintain processability and coating solution stability. One method for synthesizing acrylic fine particles having a diffusion effect uses acrylic fine particles with increased cross-linking functional groups or cross-linking agents to increase the cross-linking density of the acrylic fine particles.

Acrylic fine particles having high cross-linking density and multi-functional groups can have improved solvent resistance. The compatibility of the acrylic fine particles with a solvent, however, can deteriorate, so that the acrylic fine particles agglomerate.

The acrylic fine particles may not agglomerate in a non-polar solvent, such as benzene-toluene-xylene (BTX), used for a coating solution. However, since the acrylic fine particles are less compatible with polar solvents, such as methyl ethyl ketone (MEK), ethanol, methanol, and the like, they can agglomerate. Accordingly, the diffusing agent is not uniformly dispersed and deposited, which can decrease product quality. This can be problematic and inconvenient when selecting a solvent for acrylic particles for use in diffusion applications.

In addition, there is a need to improve optical performance and efficiency.

SUMMARY OF THE INVENTION

The present invention provides acrylic fine particles which can have excellent compatibility with a binder and a solvent while maintaining high cross-linking, can significantly increase dispersibility when used in a diffusing film, and can exhibit high heat resistance and excellent solvent resistance. The present invention further provides a diffusing film which includes the acrylic fine particles. The diffusing film can have excellent transmittance and diffusibility.

The acrylic fine particles are formed by polymerization of a monomer with a cross-linking agent, wherein the monomer comprises (meth)acrylate and wherein the cross-linking agent includes a first cross-linking agent having at least three (meth)acryloyloxy groups and at least one functional group including —OH, —COOH, or a combination thereof. The acrylic fine particles have a coefficient of variation (C.V.) of about 20 to about 60%, for example about 40 to about 60%.

In one embodiment, the first cross-linking agent may be represented by Formula 1:

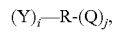

wherein:
Y is a (meth)acryloyloxy group,
R is a C1 to C10 branched hydrocarbon,
Q is —OH, —COOH, or a combination thereof,
i is an integer from 3 to 5, and
j is an integer from 1 to 5.

The acrylic fine particles may include about 60 to about 90 wt % of the monomer and about 10 to about 40% of the cross-linking agent. For example, the acrylic fine particles may include about 60 to about 85 wt % of the monomer and about 15 to about 40% of the cross-linking agent.

The (meth)acrylate containing monomer may include C1 to C10 alkyl(meth)acrylate and optionally a monomer copolymerizable therewith.

The (meth)acrylate containing monomer may include about 50 to about 100 wt % of the C1 to C10 alkyl(meth)acrylate and about 0 to about 50 wt % of the copolymerizble monomer.

Examples of the copolymerizable monomer may include without limitation aromatic vinyl monomers, cyanide vinyl monomers, C6 to C20 aromatic (meth)acrylates, hydroxyl group containing (meth)acrylates, epoxy group containing (meth)acrylates, unsaturated carboxylic acids, and the like, and combinations thereof.

The cross-linking agent may include about 60 to about 100 wt % of the first cross-linking agent and about 0 to about 40 wt % of a second cross-linking agent.

Examples of the second cross-linking agent include without limitation 1,4-butanediol di(meth)acrylate, 1,6-hexanediol di(meth)acrylate, 1,9-nonanediol di(meth)acrylate, ethylene glycol di(meth)acrylate, propylene glycol di(meth)acrylate, pentaerythritol di(meth)acrylate, trimethylolpropane tri(meth)acrylate, ditrimethylolpropane tetra(meth)acrylate, and the like, and combinations thereof.

The weight ratio of the first cross-linking agent to the second cross-linking agent may be about 1.5:1 to about 10:1.

The acrylic fine particles may have a swelling ratio of about less than 10% after being placed in methyl ethyl ketone at 25° C. for 4 hours.

The present invention further provides a diffusing film including the acrylic fine particles.

The present invention further provides a method of preparing the acrylic fine particles. The method includes preparing a monomer mixture solution by mixing a (meth)acrylate containing monomer with a cross-linking agent and an initiator, and suspension-polymerizing the monomer mixture solution.

DETAILED DESCRIPTION OF THE INVENTION

Figure 1:
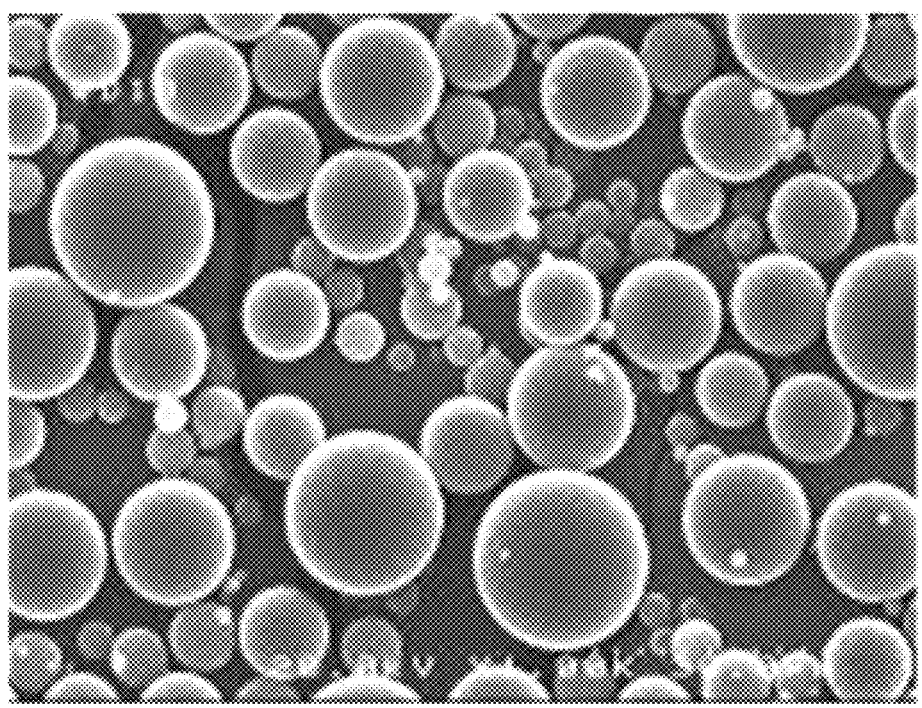
FIG. 1 is a scanning electron microscope (SEM) image to evaluate dispersibility of acrylic fine particles prepared in Example 1 in a solvent.

The present invention now will be described more fully hereinafter in the following detailed description of the invention with reference to the accompanying drawings, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Unless defined otherwise, the term "(meth)acrylate" collectively refers to both acrylate and methacrylate. Further, "(meth)acrylic acid" collectively refers to both acrylic acid and methacrylic acid. Also, "(meth)acrylamide" collectively refers to both acrylamide and methacrylamide.

Acrylic fine particles according to the present invention are formed by polymerization of a monomer with a cross-linking agent, wherein the monomer comprises (meth)acrylate and wherein the cross-linking agent includes a first cross-linking agent. The first cross-linking agent includes at least three (meth)acryloyloxy groups and at least one functional group of —OH, —COOH, or a combination thereof.

In one embodiment, the acrylic fine particles may include about 60 to about 90 wt % of the monomer, for example about 60 to about 85 wt % of the monomer, and about 10 to about 40% of the cross-linking agent, for example about 15 to about 40% of the cross-linking agent.

In some embodiments, the acrylic fine particles may include the monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the monomer can be in a range from about any of the foregoing amounts to about any other of the foregoing amounts.

In some embodiments, the acrylic fine particles may include the cross-linking agent in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the cross-linking agent can be in a range from about any of the foregoing amounts to about any other of the foregoing amounts.

When the monomer and cross-linking agent are used in amounts within this range, high solvent resistance can be obtained.

The monomer may include C1 to C10 alkyl(meth)acrylate and a monomer copolymerizable therewith.

In one embodiment, the monomer may include about 50 to about 100 wt %, for example about 60 to about 100 wt %, of the C1 to C10 alkyl(meth)acrylate and, optionally, about 50 wt % or less, for example about 0 to about 40 wt %, of the copolymerizable monomer.

In some embodiments, the monomer may include the C1 to C10 alkyl(meth)acrylate in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the amount of the C1 to C10 alkyl(meth)acrylate can be in a range from about any of the foregoing amounts to about any other of the foregoing amounts.

In some embodiments, the monomer may include the copolymerizable monomer in an amount of 0 wt % (that is, the copolymerizable monomer is not present), or in an amount of about 0 (the copolymerizable monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the copolymerizable monomer can be in a range from about any of the foregoing amounts to about any other of the foregoing amounts.

When the monomer includes the C1 to C10 alkyl(meth)acrylate and the copolymerizable monomer in an amount within this range, excellent dispersibility can be obtained.

Examples of the C1 to C10 alkyl(meth)acrylate may include, without being limited to, methyl (meth)acrylate, ethyl (meth)acrylate, propyl (meth)acrylate, n-butyl (meth)acrylate, isobutyl (meth)acrylate, 2-ethylhexyl (meth)acrylate, isooctyl (meth)acrylate, and the like, and combinations thereof. In exemplary embodiments, methyl (meth)acrylate may be used.

Examples of the copolymerizable monomer may include, without being limited to, aromatic vinyl monomers, such as styrene, p-methylstyrene, m-methylstyrene, p-ethylstyrene, m-ethylstyrene, p-chlorostyrene, m-chlorostyrene, p-chloromethylstyrene, m-chloromethylstyrene, vinyl toluene, and vinyl naphthalene; cyanide vinyl monomers, such as acrylonitrile and methacrylonitrile; C6 to C20 aromatic (meth)acrylates, such as phenyl (meth)acrylate, benzyl (meth)acrylate, 2-phenylethyl (meth)acrylate, 3-phenylpropyl (meth)acrylate, 4-phenylbutyl (meth)acrylate, 2-2-methylphenylethyl (meth)acrylate, 2-3-methylphenylethyl (meth)acrylate, and 2-4-methylphenylethyl (meth)acrylate; hydroxyl group containing (meth)acrylates, such as 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, and 1,4-cyclohexanedimethanol mono (meth)acrylate; epoxy group containing (meth)acrylates, such as glycidyl acrylate and glycidyl methacrylate; unsaturated carboxylic acids, such as acrylic acid and methacrylic acid; and the like, combinations thereof.

In one embodiment, the acrylic fine particles may include about 90 wt % or more, for example about 92 to about 100 wt % of methyl methacrylate as a monomer component. In some embodiments, the monomer may include methyl methacrylate as a monomer component in an amount of about 92, 93, 94, 95, 96, 97, 98, 99, or 100 wt %. Further, according to some embodiments of the present invention, the amount of methyl methacrylate can be in a range from about any of the foregoing amounts to about any other of the foregoing amounts.

When the acrylic fine particles including methyl methacrylate in an amount within this range, the acrylic fine particles can have a refractive index of 1.35 to about 1.55, which can be suitable for use as a diffusing agent, and can also maintain solvent resistance.

In one embodiment, the cross-linking agent may include the first cross-linking agent only.

Alternatively, the cross-linking agent may include a mixture of the first cross-linking agent and a second cross-linking agent.

In one embodiment, the cross-linking agent may include about 60 to about 100 wt %, for example about 65 to about 95 wt %, of the first cross-linking agent and, optionally, about 40 wt % or less, for example about 5 to about 35 wt %, of the second cross-linking agent.

In some embodiments, the cross-linking agent may include the first cross-linking agent in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the amount of the first cross-linking agent can be in a range from about any of the foregoing amounts to about any other of the foregoing amounts.

In some embodiments, the cross-linking agent may include the second cross-linking agent in an amount of 0 wt % (that is, the second cross-linking agent is not present), or in an amount of about 0 (the second cross-linking agent is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the second cross-linking agent can be in a range from about any of the foregoing amounts to about any other of the foregoing amounts.

When the cross-linking agent includes a first cross-linking agent and a second cross-linking agent in amounts within this range, excellent solvent resistance and polymerization stability can be obtained.

When the cross-linking agent includes a mixture of the first cross-linking agent and the second cross-linking agent, a weight ratio of the first cross-linking agent to the second cross-linking agent may be about 1.5:1 to about 10:1, for example 2 to about 8:1. Within this range, excellent solvent resistance and dispersibility can be obtained.

The first cross-linking agent may have at least three (meth) acryloyloxy groups and at least one functional group including —OH, —COOH, or a combination thereof.

In one embodiment, the first cross-linking agent may be represented by Formula 1:

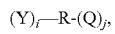

wherein:
Y is a (meth)acryloyloxy group,
R is a C1 to C10 branched hydrocarbon, for example C1-C10 branched alkylene,
Q is —OH, —COOH, or a combination thereof,
i is an integer from 3 to 5, and
j is an integer from 1 to 5.

Examples of the first cross-linking agent may include without limitation pentaerythritol triacrylate, dipentaerythritol pentaacrylate, and the like, and combinations thereof. In exemplary embodiments, pentaerythritol triacrylate may be used.

Examples of the second cross-linking agent may include without limitation 1,4-butanediol di(meth)acrylate, 1,6-hexanediol di(meth)acrylate, 1,9-nonanediol di(meth)acrylate, ethylene glycol di(meth)acrylate, propylene glycol di(meth)acrylate, pentaerythritol di(meth)acrylate, trimethylolpropane tri(meth)acrylate, ditrimethylolpropane tetra(meth)acrylate, and the like, and combinations thereof. In exemplary embodiments, 1,6-hexanediol di(meth)acrylate and/or trimethylolpropane tri(meth)acrylate may be used.

The acrylic fine particles may be prepared by any polymerization method generally known in the art, e.g., bulk polymerization, solution polymerization, emulsion polymerization, suspension polymerization, and the like. In exemplary embodiments, suspension polymerization may be used.

In one embodiment, the acrylic fine particles may be prepared by mixing a (meth)acrylate containing monomer with a cross-linking agent, followed by addition of a polymerization initiator and then a suspension stabilizer and polymerization. The polymerization can be performed at a temperature of about 30 to about 120° C., for example about 50 to about 90° C.

Examples of the polymerization initiator may include without limitation peroxide compounds, such as benzoyl peroxide, lauroyl peroxide, o-chlorobenzoyl peroxide, o-methoxybenzoyl peroxide, t-butyl peroxy-2-ethylhexanoate, t-butyl peroxy isobutyrate, 1,1,3-3-tetramethylbutyl peroxy-2-ethylhexanoate, dioctanoyl peroxide, and didecanoyl peroxide; azo compounds, such as 2,2'-azobis(isobutyronitrile), 2,2'-azobis(2-methylbutyronitrile), and 2,2'-azobis(2, 4-dimethylvaleronitrile), and the like, and combinations thereof. The polymerization initiator may be present in an amount of about 0.1 to about 20 parts by weight based on about 100 parts by weight of the mixture of the monomer and the cross-linking agent.

The suspension stabilizer may include, without being limited to, water-soluble high molecular weight molecules, such as gelatin, starch, methyl cellulose, ethyl cellulose, hydroxyethyl cellulose, carboxymethyl cellulose, polyvinylpyrrolidone, polyvinyl alkyl ether, polyvinyl alcohol, polyacrylic acid, polyacrylamide, polyethylene oxide, sodium polymethacrylate, and polydimethylsiloxane/polystyrene block copolymer, barium sulfate, calcium lactate, calcium carbonate, calcium phosphate, aluminum lactate, talc, clay, diatomite, metal oxide powder, and the like, and combinations thereof. The suspension stabilizer may be used in an amount of about 0.01 to about 20 parts by weight based on about 100 parts by weight of the mixture of the monomer and the cross-linking agent.

The acrylic fine particles prepared as above may have a volume mean size of about 1 to about 50 μm, for example about 10 to about 30 μm, and may have a coefficient of variation of about 20 to about 60%, for example about 30 to about 60%, and as another example about 40 to about 60%.

In one embodiment, the acrylic fine particles may have a swelling ratio of about less than 10% after being placed in MEK at 25° C. for 4 hours, for example about less than 5%, and as another example about 1% or less.

The present invention also provides a diffusing film including the acrylic fine particles.

The diffusing film may be prepared by mixing a transparent thermoplastic resin with the acrylic fine particles. In one embodiment, the acrylic fine particles may be present in an amount of about 0.1 to about 50 parts by weight, for example about 10 to about 35 parts by weight, based on about 100 parts by weight of the transparent thermoplastic resin.

In some embodiments, the diffusing film may include the acrylic fine particles in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the acrylic fine particles can be in a range from about any of the foregoing amounts to about any other of the foregoing amounts.

Examples of the transparent thermoplastic resin may include, without being limited to, (meth)acrylic resins, polycarbonate resins, polyester resins, aromatic vinyl resins, and the like, and combinations thereof.

The diffusing film using the acrylic fine particles as a diffusing agent can have excellent diffusibility and transmittance.

Hereinafter, the constitution and functions of the present invention will be explained in more detail with reference to the following examples. These examples are provided for illustrative purposes only and are not to be in any way construed as limiting the present invention.

A description of details apparent to those skilled in the art will be omitted.

EXAMPLES

Examples 1 and 2 and Comparative Examples 1 to 3

Preparation of Acrylic Fine Particles

Example 1

70 parts by weight of methyl methacrylate (MMA), 20 parts by weight of pentaerythritol triacrylate as a first cross-linking agent, and 10 parts by weight of trimethylolpropane triacrylate (TMPTA) as a second cross-linking agent are mixed. To the mixture, 1 part by weight of benzoyl peroxide (BPO) as a polymerization initiator is added, to prepare a monomer mixture solution. 0.5 wt % of polyvinyl alcohol (PVA) as a suspension stabilizer is dissolved in 400 parts by weight of deionized water as a dispersion medium to prepare a suspension, after which the monomer mixture solution is added to the suspension, followed by homogenization at 8,000 rpm for 5 minutes using a high-speed homogenizer to prepare an emulsion. Then, the emulsion is reacted in a 4-neck flask at 65° C. for 6 hours under nitrogen atmosphere, and then is heated to 75° C. and polymerized for 4 hours. The synthesized polymer is filtered and washed with water and an aqueous ethanol solution, followed by drying in a vacuum oven for 1 day to produce a white and odorless spherical polymer powder. The prepared acrylic fine particles are identified through SEM to evaluate dispersibility in a solvent, and an SEM image of the acrylic fine particles is shown in FIG. 1.

Example 2

Figure 2:
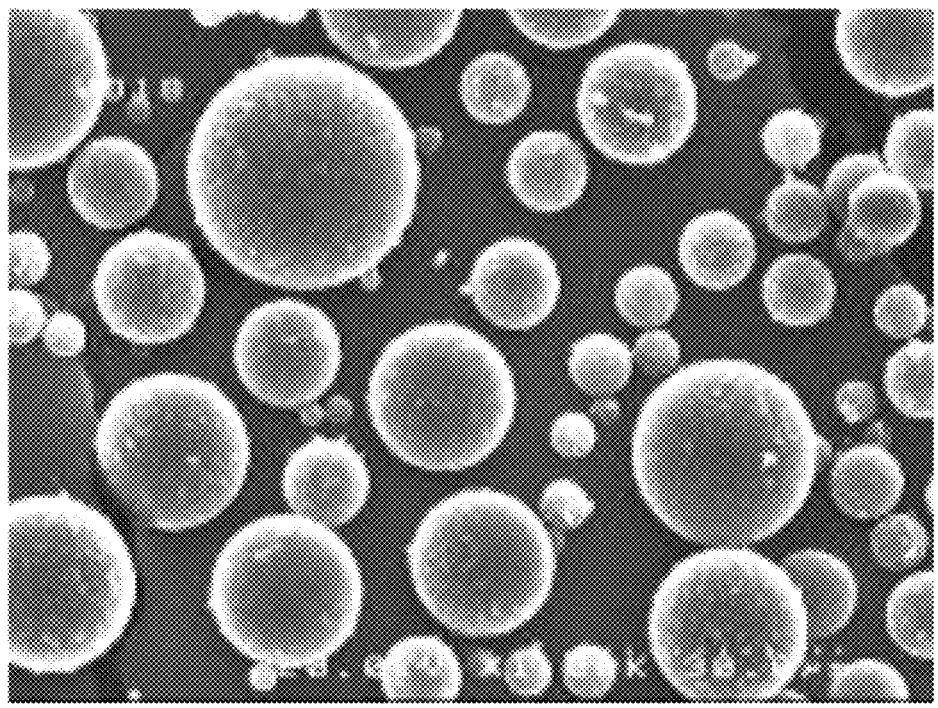
FIG. 2 is an SEM image to evaluate dispersibility of acrylic fine particles prepared in Example 2 in a solvent.

Acrylic fine particles are prepared in the same manner as in Example 1 except that 30 parts by weight of pentaerythritol triacrylate as a first cross-linking agent are added and a second cross-linking agent is not used. The prepared acrylic fine particles are identified through SEM to evaluate dispersibility in a solvent, and an SEM image of the acrylic fine particles is shown in FIG. 2.

Comparative Example 1

Figure 3:
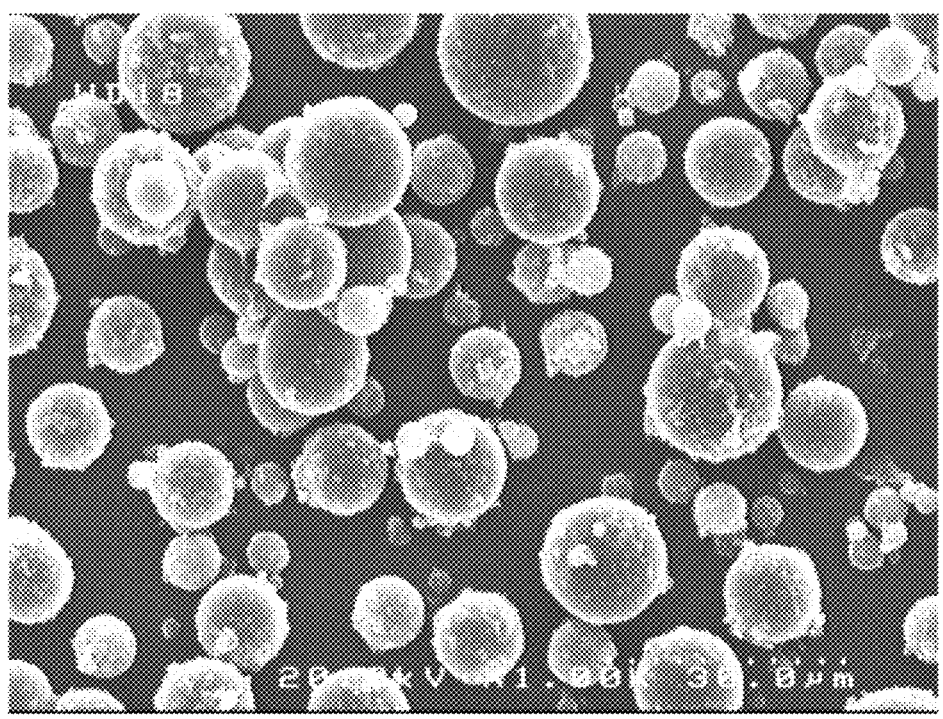
FIG. 3 is an SEM image to evaluate dispersibility of acrylic fine particles prepared in Comparative Example 1 in a solvent.

Acrylic fine particles are prepared in the same manner as in Example 1 except that 30 parts by weight of ethylene glycol di(meth)acrylate (EGDMA) are added as a cross-linking agent. The prepared acrylic fine particles are identified through SEM to evaluate dispersibility in a solvent, and an SEM image of the acrylic fine particles is shown in FIG. 3.

Comparative Example 2

Figure 4:
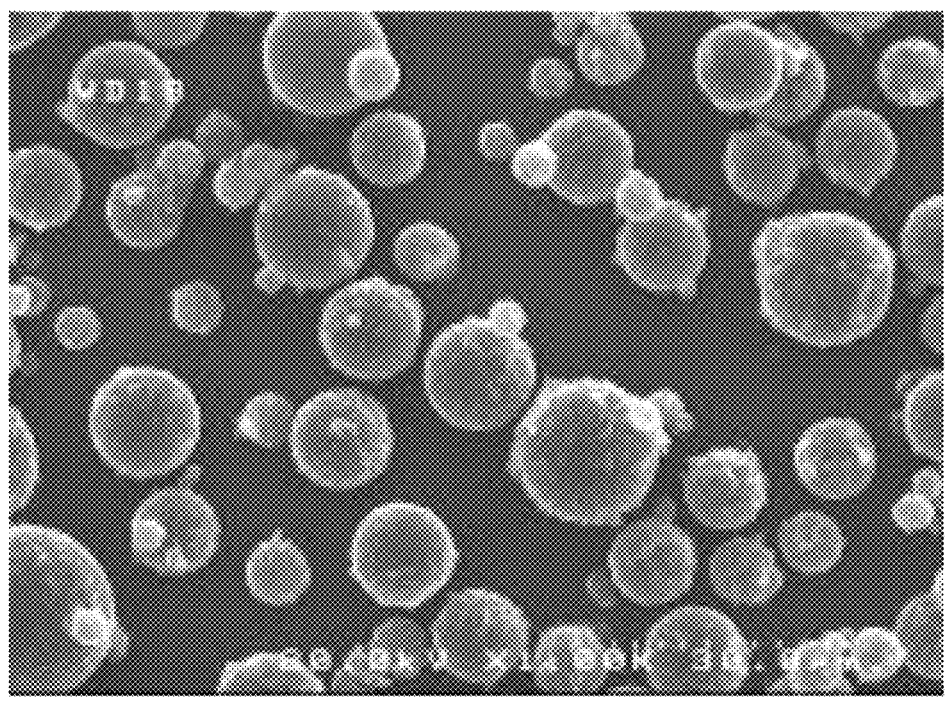
FIG. 4 is an SEM image to evaluate dispersibility of acrylic fine particles prepared in Comparative Example 2 in a solvent.

Acrylic fine particles are prepared in the same manner as in Example 1 except that 1,6-hexanediol di(meth)acrylate (HDDA) are used as a first cross-linking agent instead of pentaerythritol triacrylate. The prepared acrylic fine particles are identified through SEM to evaluate dispersibility in a solvent, and an SEM image of the acrylic fine particles is shown in FIG. 4.

Comparative Example 3

Figure 5:
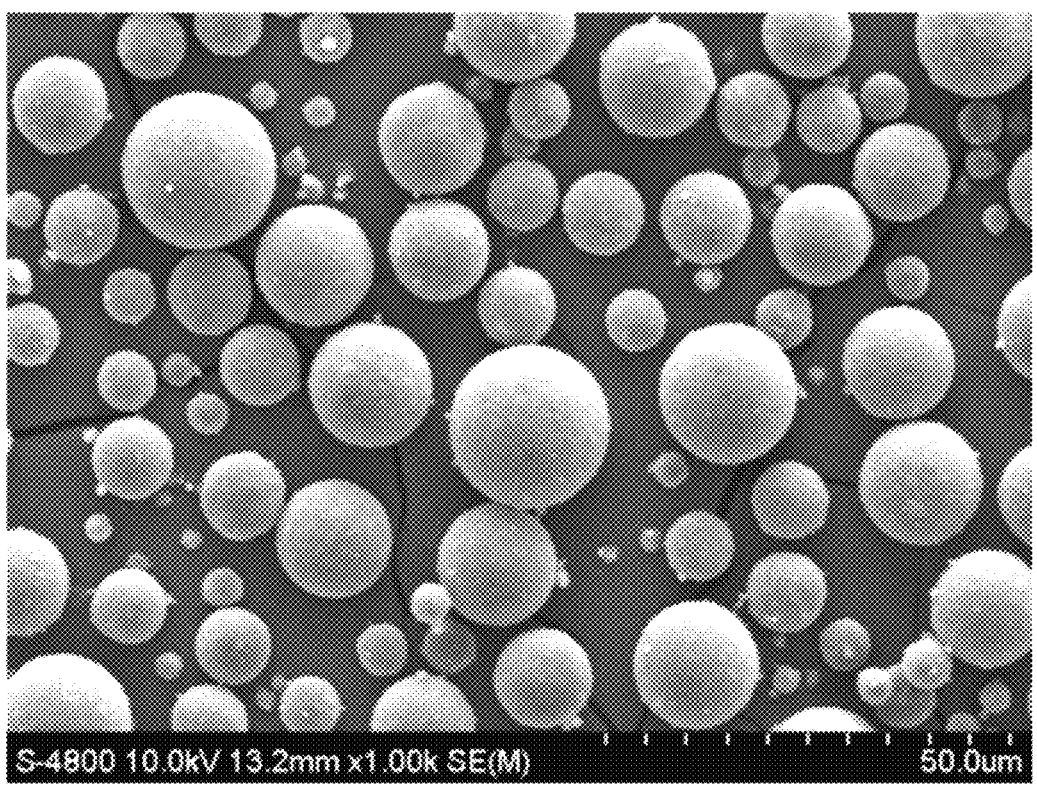
FIG. 5 is an SEM image to evaluate dispersibility of acrylic fine particles prepared in Comparative Example 3 in a solvent.

Acrylic fine particles are prepared in the same manner as in Example 1 except that 30 parts by weight of 1,6-hexanediol di(meth)acrylate (HDDA) are added as a cross-linking agent. The prepared acrylic fine particles are identified through SEM to evaluate dispersibility in a solvent, and an SEM image of the acrylic fine particles is shown in FIG. 5.

Comparative Example 4

Acrylic fine particles are prepared in the same manner as in Example 2 except that 5 parts by weight of pentaerythritol triacrylate and 95 parts by weight of methyl methacrylate (MMA) are used as a first cross-linking agent.

Evaluation of Physical Properties (1) Solvent Resistance 15 g of MEK and 2 g of acrylic fine particles are placed in a 20 ml vial and left for 4 hours, followed by evaluation of the difference in swelling. A swelling ratio is measured as follows.

$$\text{swelling ratio} = \frac{Hb - Ha}{Ha} \times 100$$

Figure 6A:
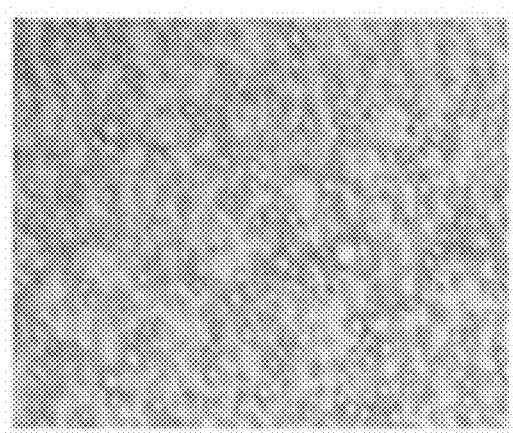
FIGS. 6A and 6B are optical microscope images to evaluate dispersibility of acrylic fine particles prepared in Example 1 in a solvent (FIG. 6A) and dispersibility of acrylic fine particles prepared in Comparative Example 1 in a solvent (FIG. 6B).
Figure 6B:
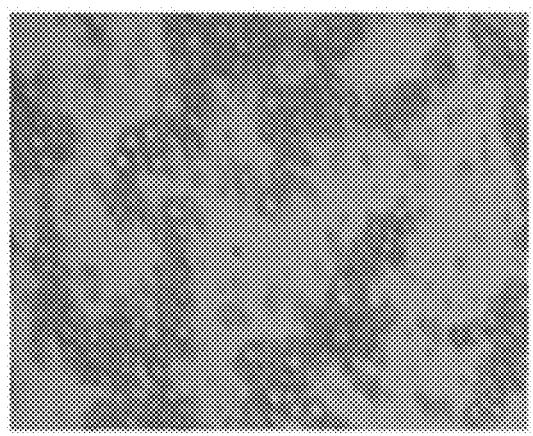

Hb: height of particles after 4 hours in solvent
Ha: initial height of particles (2) Dispersibility in Solvent 10 g of ethanol and 1 g of acrylic fine particles are mixed, stirred for 10 minutes, and dropped on a glass slide, and the dispersibility is evaluated through SEM analysis. Results are shown in FIGS. 1 to 5. The specimens of Example 1 and Comparative Example 1 are measured with a magnification of 50 using an optical microscope (BX51, Olympus), and results are shown in FIGS. 6A and 6B, respectively.

(3) Coefficient of Variation 18 g of water, 0.5 g of acrylic fine particles, and 3 g of a dispersant solution (ethanol:toluene=5:5) are placed in a vial and treated for 10 minutes in an ultrasonic device, followed by measurement at a refractive index of 1.49 and 25° C. using LS 13 320 (Beckman Coulter). Then, a coefficient of variation is calculated according to Equation 1;

$$C.V = \left(\frac{\sigma}{M}\right) \times 100,$$

wherein M is the mean volume size of particles, and σ is standard deviation.

(4) Film Appearance 25 parts by weight of the prepared fine particles, 30 parts by weight of MEK, 15 parts by weight of toluene, and 30 parts by weight of an acrylic binder (AA-910T, Aekyung Chemical Co., Ltd.) are mixed and left for 1 day to prepare a coating solution. The coating solution is deposited on a PET film using a #10 bar and dried at 120° C. for 1 minute to prepare a film sample. The film sample is cut into 5×5 pieces and observed using an optical microscope to evaluate film appearance.

TABLE 1

| Category | | Example 1 | Example 2 | Comparative Example 1 | Comparative Example 2 | Comparative Example 3 | Comparative Example 4 |
|---|---|---|---|---|---|---|---|
| Monomer | | 70 | 70 | 70 | 70 | 70 | 95 |
| Cross-linking agent | PETA | 20 | 30 | — | — | — | 5 |
| | TMPTA | 10 | — | — | 10 | — | — |
| | EGDMA | — | — | 30 | — | — | — |
| | HDDA | — | — | — | 20 | 30 | — |
| Mean size | [μm] | 15.2 | 15.8 | 15.0 | 15.2 | 15.0 | Unmeasurable |
| C.V. | [%] | 46 | 50 | 50 | 42 | 50 | Unmeasurable |
| Film appearance | | O.K | O.K | Slight agglomeration | O.K | O.K | Agglomeration |
| Solvent resistance | | 1% | 3% | 10% | 25% | 28% | 57% |

As shown in Table 1 and FIGS. 1 to 5, the acrylic fine particles according to Examples 1 and 2 have excellent film appearance, solvent resistance, and dispersibility. However, the acrylic fine particles according to Comparative Example 1 have an agglomerated film appearance and have reduced solvent resistance. The acrylic fine particles according to Comparative Examples 2 and 3 have excellent film appearance but have reduced solvent resistance. The acrylic fine particles according to Comparative Example 4, where an excessive amount of the monomer is used, cannot be measured with regard to mean size and coefficient of variation, have an agglomerated film appearance, and exhibit significantly reduced solvent resistance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. Acrylic fine particles formed by polymerization of a monomer with a cross-linking agent, wherein the monomer comprises (meth)acrylate, and wherein said cross-linking agent comprises a first cross-linking agent having at least three (meth)acryloyloxy groups and at least one functional group —OH, —COOH, or a combination thereof, and wherein the acrylic fine particles have a coefficient of variation (C.V.) of about 20 to about 60% and a volume mean size of about 10 to about 50 μm.

2. The acrylic fine particles of claim 1, wherein said acrylic fine particles have a coefficient of variation of about 40 to about 60%.

3. The acrylic fine particles of claim 1, wherein said first cross-linking agent is represented by Formula 1:

wherein:
Y is a (meth)acryloyloxy group,
R is a C1 to C10 branched hydrocarbon,
Q is —OH, —COOH, or a combination thereof,
i is an integer from 3 to 5, and
j is an integer from 1 to 5.

4. The acrylic fine particles of claim 1, wherein said acrylic fine particles comprise about 60 to about 90 wt % of the monomer and about 10 to about 40% of the cross-linking agent.

5. The acrylic fine particles of claim 1, wherein said acrylic fine particles comprise about 60 to about 85 wt % of the monomer and about 15 to about 40% of the cross-linking agent.

6. The acrylic fine particles of claim 1, wherein said monomer comprises C1 to C10 alkyl (meth)acrylate and a monomer copolymerizable therewith.

7. The acrylic fine particles of claim 6, wherein said monomer comprises about 50 to about 100 wt % of the C1 to C10 alkyl (meth)acrylate and about 50 wt % or less of the copolymerizable monomer.

8. The acrylic fine particles of claim 6, wherein said copolymerizable monomer comprises an aromatic vinyl monomer, a cyanide vinyl monomer, C6 to C20 aromatic (meth)acrylate, hydroxyl group containing (meth)acrylate, epoxy group containing (meth)acrylate, unsaturated carboxylic acid, or a combination thereof.

9. The acrylic fine particles of claim 1, wherein said cross-linking agent further comprises a second cross-linking agent comprising 1,4-butanediol di(meth)acrylate, 1,6-hexanediol di(meth)acrylate, 1,9-nonanediol di(meth)acrylate, ethylene glycol di(meth)acrylate, propylene glycol di(meth)acrylate, pentaerythritol di(meth)acrylate, trimethylolpropane tri(meth)acrylate, ditrimethylolpropane tetra(meth)acrylate, or a combination thereof.

10. The acrylic fine particles of claim 9, wherein said cross-linking agent comprises about 60 to about 100 wt % of the first cross-linking agent and about 40 wt % or less of the second cross-linking agent.

11. The acrylic fine particles of claim 10, wherein a weight ratio of the first cross-linking agent to the second cross-linking agent is about 1.5:1 to about 10:1.

12. The acrylic fine particles of claim 1, wherein said acrylic fine particles have a swelling ratio of about less than 10% after being placed in methyl ethyl ketone at 25° C. for 4 hours.

13. A diffusing film comprising the acrylic fine particles of claim 1.

14. A method of preparing acrylic fine particles comprising:
preparing a monomer mixture solution by mixing a monomer comprising (meth)acrylate, a cross-linking agent comprising a first cross-linking agent having at least three (meth)acryloyloxy groups and at least one functional group —OH, —COOH, or a combination thereof, and an initiator; and
suspension-polymerizing the monomer mixture solution to form acrylic fine particles having a volume mean size of about 10 to about 50 μm.

15. The method of claim 14, wherein said first cross-linking agent is represented by Formula 1:

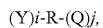

wherein:
Y is a (meth)acryloyloxy group,
R is a C1 to C10 branched hydrocarbon,
Q is —OH, —COOH, or a combination thereof,
i is an integer from 3 to 5, and
j is an integer from 1 to 5.

* * * * *